United States Patent [19]

Gosis et al.

[11] Patent Number: 4,578,585
[45] Date of Patent: Mar. 25, 1986

[54] DETECTOR HEAD MOUNTING MECHANISM

[75] Inventors: Anatoly I. Gosis, Palatine; Frank J. Bartos, Elmhurst, both of Ill.

[73] Assignee: Siemens Gammasonics, Inc., Des Plaines, Ill.

[21] Appl. No.: 555,100

[22] Filed: Nov. 25, 1983

[51] Int. Cl.⁴ .................. G01T 1/166; G21K 1/02
[52] U.S. Cl. .................. 250/363 S; 378/148; 378/149
[58] Field of Search ........... 250/363 S, 363 R, 505.1; 378/148, 149

[56] References Cited

U.S. PATENT DOCUMENTS

| | | |
|---|---|---|
| 3,011,057 | 11/1961 | Anger . |
| 3,732,419 | 5/1973 | Kulberg et al. . |
| 3,984,689 | 10/1976 | Arseneau .................. 250/369 |
| 4,216,381 | 8/1980 | Lange .................. 250/363 S |
| 4,417,143 | 11/1983 | Haas et al. .................. 250/363 S |
| 4,438,335 | 3/1984 | Meeder .................. 250/363 S |

FOREIGN PATENT DOCUMENTS 54-154388  12/1979  Japan .................. 250/363 S

*Primary Examiner*—Alfred E. Smith
*Assistant Examiner*—Carolyn E. Fields
*Attorney, Agent, or Firm*—John Francis Moran

[57] ABSTRACT

A first pinhole and an associated first pin and also a second pinhole and an associated second pin are mounted between a detector head and a detector head supporting structure such that the first pinhole and the first pin are concentric with a first axis and the second pinhole and the second pin are concentric with a second axis. The pins can be shifted relatively to each other along each axis in opposite directions, so that when one pin intrudes in its pinhole the other pin is located outside its pinhole. The axis of the intruding pin defines the trunnion axis of the detector head.

17 Claims, 4 Drawing Figures

DETECTOR HEAD MOUNTING MECHANISM

BACKGROUND OF THE INVENTION

1. Field of the Invention

This invention relates to a mechanism for mounting a detector head including a collimator onto the supporting structure of a radiation detecting device used for medical diagnostic purposes.

2. Description of the Prior Art

Radiation detectors, such as nuclear radiation detectors like scintillation cameras, are widely used to develop information for medical diagnostic purposes based on signals derived from a source of radiation. Such radiation detectors are used in noninvasive medical diagnostic procedures wherein a head of the detector pivotally mounted onto supporting structure is positioned to face a part of the patient under study (e.g. a body organ) at all times. A commonly used radiation detector for such purposes is an Anger-type scintillation camera (named for its inventor), the basic principles of operation of which are disclosed in U.S. Pat. Nos. 3,011,057; 3,732,419 and 3,984,689. The radiation detector computes the distribution of the radiation emitting substance previously ingested by the patient as detected by the detector head from its viewing position, and analyzes this data to produce diagnostic information about the object of study. This is done by determining the distribution of the radiation emitting substance in the human body organ by analyzing the locations of scintillation events which occur on a scintillation crystal due to rays incident from the body organ. The Anger camera and other radiation detectors typically employ a radiation collimator between the radiation sensitive transducer (e.g. the crystal in the Anger camera) and the source of radiation.

The purpose of using a radiation collimator is to provide radiation transmissive passageways to ensure a mapping correspondence between respective elemental volumes of the radiation source (e.g. the body organ) and elemental volumes of the transducer (e.g. the Anger camera crystal). The most commonly used collimator is of a multi-channel type which comprises a number of radiation transmitting apertures or channels separated from each other by radiation opaque walls or septa. The collimator ensures that only rays traveling parallel to the radiation transmitting channels of the collimator will be transmitted from the patient to the radiation transducer; the passage of other rays will be blocked. The choice of collimator to be used with the detector head in a particular medical diagnostic procedure, depends on the energy level of the radiation emitting substance being used.

It is well known that radiation collimator design involves basically the parameters of aperture size and shape, septal thickness, and aperture length. These are the parameters which determine the resolution and the efficiency of the collimator for radiation (e.g. gamma rays) of a particular energy. In general, the septal thickness, which is the thickness of the walls separating adjacent collimating apertures, is chosen in accordance with the energies of the rays to be collimated so that the collimator will block the rays which enter the collimator at an angle and location such that they would otherwise traverse the wall between two apertures. Thus, the septal thickness must be relatively large for collimators used with high energy radiation sources, but for low or medium energy sources the septum or wall between the apertures may be quite thin. It is desirable to employ only the septal thickness actually required for the radiation energy involved in order to avoid unnecessary loss of efficiency.

The supporting structure for a radiation detector, such as an Anger-type scintillation camera, generally includes a base on which is located a height-adjustable support arm having a yoke between the bifurcated ends of which is received the detector head. The head is positioned in the yoke so that it may be oriented into a desired position relative to the patient. The detector head, including a collimator selected for the intended application of the detector, is pivotally mounted onto the supporting structure for rotation about a single trunnion axis running through the respective pivot points of attachment of the head to the respective ends of the yoke. Brake or other locking means is provided to fix the position of the head relative to the supporting structure yoke after the desired positioning has been achieved. For ease of adjustment and greater patient safety, it has been found advantageous to mount the detector head onto the supporting structure so that the trunnion axis about which the head rotates coincides with the center of gravity of the head including the collimator. Such balancing is especially desirable where the supporting structure is adapted to rotate the head to provide emission computerized tomography (ECT), in which the detector head precesses about the patient to produce a display showing the radioactive distribution in the object of study in a number of parallel section imaging planes. Prior art structure mounting the detector head for emission computerized tomography is disclosed in U.S. Pat. No. 4,216,381. Commonly assigned, copending application Ser. No. 273,446 filed June 15, 1981, (now U.S. Pat. No. 4,417,143) by Haas, et al., entitled "Improved Apparatus for Driving a Radiation Detector" shows newly proposed supporting structure mounting the detector head for ECT application.

A disadvantage of existing mechanisms for mounting a detector head relative to supporting structure of a radiation detector, wherein the detector head is mounted for pivotal movement about a single trunnion axis, is the inability to maintain the detector head in a balanced configuration for different weight collimators. Low energy collimators, for example, may be approximately 80 lbs. lighter than medium energy collimators. Thus, where a detector head including a collimator is pivotally mounted onto the supporting structure of a radiation detector so that the center of gravity of the head is coincident with the single trunnion axis, changing collimators can result in an unbalanced detector head because of the weight differential for different collimator types. An unbalanced head is undesirable for operational ease and patient safety reasons.

At least two suggestions have already been made to overcome this problem.

The Japanese Patent No. 54-154,388 (Suzuki), for example, describes matching the center of a scintillation camera head to the center of rotation when different collimators are used, by dislocating a balance weight in the camera housing. Dislocating a balance weight however, is mechanically complicated and difficult to operate.

The commonly assigned, copending application Ser. No. 298,635, filed Sept. 2, 1981, by Raymond L. Meeder, now U.S. Pat. No. 4,438,335 entitled "Detector Head Mounting Apparatus" shows another solution. A mechanism is provided for mounting a detector head including a collimator onto supporting structure of a radiation detector for rotation about a selected one of a plurality of trunnion axes, the selection being made so that rotation occurs about the trunnion axis which passes nearest to the center of gravity of the head. For this purpose, a first rotatable member is mounted to the supporting structure for rotation about a first trunnion axis and a second rotatable member is mounted to the first rotatable member for rotation about a second trunnion axis. A key mounted on the first rotatable member shifts between protrusion into a first key slot located on the supporting structure and a second key slot located on the second rotatable member. The shifting mechanism is locked when the detector head is in a position other than a collimator changing position. Selecting of the right axis is activated by the weight of the collimator. This solution is mechanically less complicated and less difficult to operate than displacing a counterweight. However, this solution is still not yet simple enough.

SUMMARY OF THE INVENTION

1. Objects

It is an object of the present invention to provide a mechanism for pivotally mounting a detector head including an interchangeable collimator onto supporting structure of a radiation detector which mechanism is mechanically very uncomplicated and which allows a fast switching from one trunnion axis to another so that the head is maintained in a balanced condition when the collimator is interchanged.

2. Summary

According to this invention a mechanism is provided for pivotally mounting a detector head including an interchangeable collimator onto supporting structure of a radiation detector which comprises:
(a) means for mounting the head onto the supporting structure for rotation about a selected one of a first axis and a second axis; and
(b) means for selecting the axis about which the detector head can rotate whereby the head will be rotatable about the axis which passes nearest to the center of gravity of the head;
wherein the head mounting means includes
(a1) a first pinhole and an associated first pin mounted between the supporting structure and the detector head concentric with the first axis and shiftable relatively to each other along the first axis between a first shift position wherein the first pin intrudes into the first pinhole and a second shift position wherein the first pin is located outside the first pinhole; and
(a2) a second pinhole and an associated second pin mounted between the supporting structure and the detector head concentric with the second axis and shiftable relatively to each other along the second axis between a first shift position wherein the second pin intrudes into the second pinhole and a second shift position wherein the second pin is located outside the second pinhole;
and wherein the axis selecting means includes
means for shifting the pinholes and associated pins relatively to each other in opposite directions such that when one pinhole and the associated pin are in the first shift position, the other pinhole and associated pin are in the second shift position.

The mechanism according to the invention is mechanically uncomplicated and it allows fast switching from one trunnion axis to another by means of shifting pins and pinholes relatively to each other so that the detector head is maintained in a balanced condition when the collimator is interchanged.

The foregoing and other objects, features and advantages of the invention will be apparent from the following more particular description of a preferred embodiment of the invention, as illustrated in the accompanying drawings.

BRIEF DESCRIPTION OF THE DRAWINGS

In the drawings.

Throughout the drawings, like elements are referred to by like numerals.

DESCRIPTION OF THE PREFERRED EMBODIMENT

Figure 1:
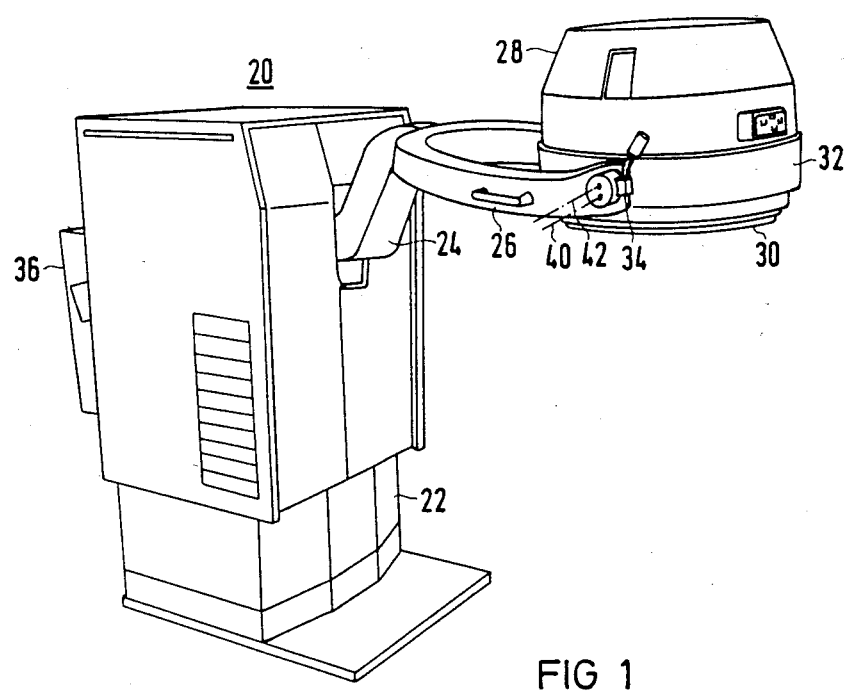
FIG. 1 is an overall perspective view showing a detector head including a collimator pivotally mounted by means of mechanism in accordance with an embodiment of the present invention onto supporting structure of a radiation detector.

For illustrative purposes, a preferred embodiment of the invention is described as implemented to pivotally mount a detector head onto supporting structure of an Anger-type scintillation camera which is adapted for emission computerized tomography (ECT), such as described in the commonly-owned, copending patent application Ser. No. 273,446 of Haas et al., now U.S. Pat. No. 4,417,143, entitled "Improved Apparatus for Driving a Radiation Detector", which was filed June 15, 1981. As shown in FIG. 1, the Anger-type camera 20 includes a base 22 on which is mounted a support arm 24 including a yoke portion 26. A detector head 28, including a collimator 30 is pivotally mounted between the bifurcated ends of the yoke 26 by means of a detector head trunnion ring 32 and a detector head mounting mechanism 34 according to the invention. A counterweight 36 is carried at the end of the support arm 24 opposite to the yoke portion 26 and serves the purpose of balancing the moment of the weight of the detector head 28 about the point of attachment of the support arm 24 to the base 22. As described in the copending patent application Ser. No. 273,446, the arm 24 is mounted atop the base 22 to drive the detector head 28 in a precessing orbit about a patient (for example, about the cranial-caudal axis of the patient), with the detector head 28 locked in a preset pivotal position with respect to the yoke 26 for desired orientation of the face of the head 28 with respect to the patient.

Figure 2:
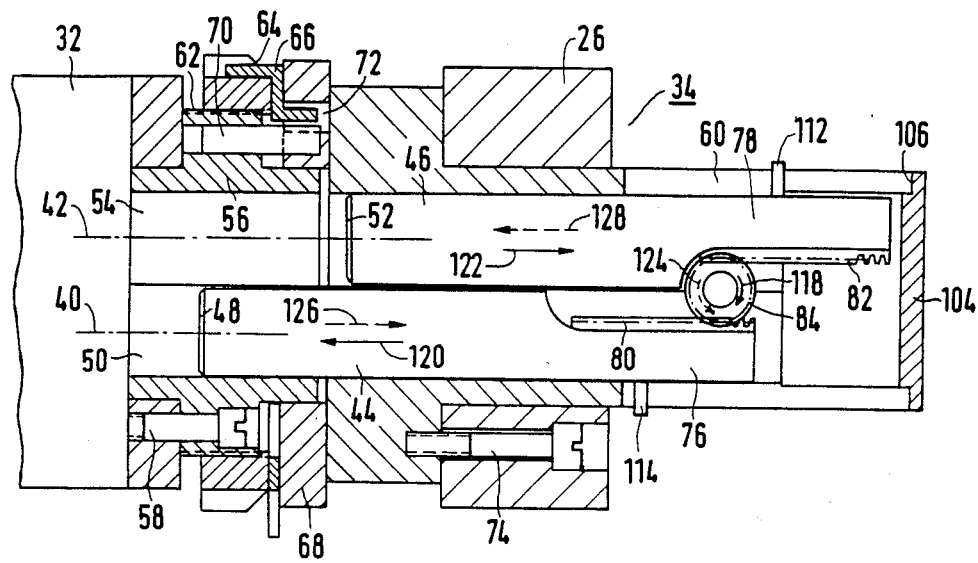
FIG. 2 is a diagrammatic side elevation and sectional view of a mounting mechanism according to the invention.
Figure 3:
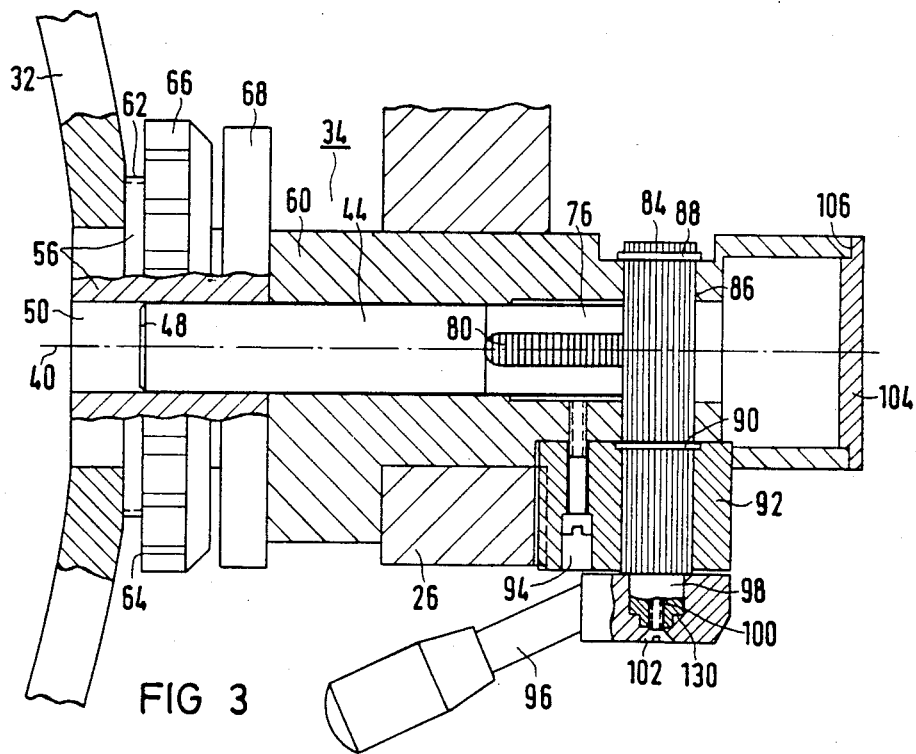
FIG. 3 is a diagrammatic plan elevation and sectional view of the same mounting mechanism.
Figure 4:
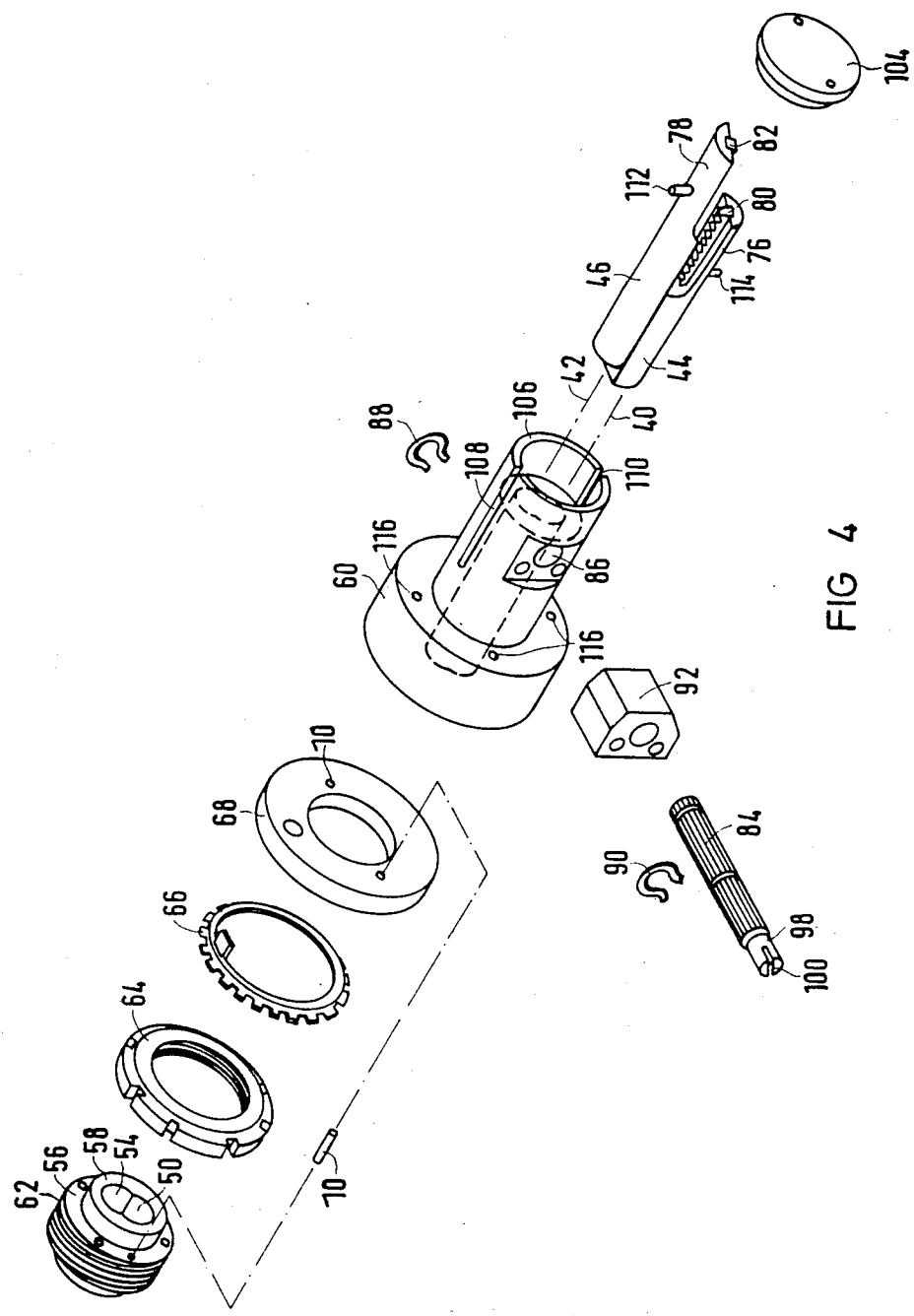
FIG. 4 is an exploded perspective view showing the components of the mounting mechanism.

The details of the mechanism for mounting the detector head 28 onto the yoke portion 26 for rotation about a selected one of a first trunnion axis 40 and a second trunnion axis 42 are shown in FIGS. 2-4.

According to these figures each mechanism 34 at each of both bifurcated ends of the yoke 26 comprises a first pin 44 and a second pin 46. The first pin 44 has a front end 48 which fits into a first bore 50. The second pin 46 has also a front end 52 which fits into a second bore 54. The first bore 50 and the second bore 54 are part of a trunnion cartridge 56 which is attached to the trunnion ring 32 by means of bolts 58.

The pins 44 and 46 are located in the interior of a pin cartridge 60 which is fixed by means of the pins 44, 46 to the trunnion cartridge 56 (in FIGS. 2 and 3 for example, pin 44 holds complete pin cartridge 60 in the bore 54 of the trunnion cartridge 56). The trunnion cartridge 56 comprises an external thread 62 on which is screwed a lock nut 64. The lock nut 64 bears a lock washer 66. The element 68 is a ring which is attached to the trunnion cartridge 56 by means of dowel pins 70. The combination of lock nut 64, lock washer 66 and ring 68 serves for adjusting the distance between trunnion ring 32 or trunnion cartridge 56 and front surface 72 of the pin cartridge 60. Due to this, the tolerance between trunnion ring 32 and yoke 26 can be compensated. The pin cartridge 60 of each detector head mounting mechanism is fastened by means of mounting screws 74 to the associated end of yoke 26.

Each pin 44 and 46 also comprises a reduced end portion 76 and 78 in each of which there is inserted a rack 80, 82 respectively. The racks 80, 82 are driven by a driving pinion 84 which is retained in bore 86 of the pin cartridge 60 by means of retaining rings 88 and 90 and mounting block 92, which is attached to pin cartridge 60 by means of screws 94. Driving pinion 84 can be rotated both clockwise and counterclockwise by means of a handle 96. Handle 96 is attached to an end shaft 98 of pinion 84 by means of slot 100, key 130, and screw 102. Element 104 is a cover for end 106 opposite to front surface 72 of the pin cartridge 60. Elements 108 and 110 in pin cartridge 60 are pin alignment slots to align motion of pins 44 and 46 by means of dowel pins 112 and 114. Elements 116 are yoke attachment threads for screws 74.

When rotating the pinion 84 clockwise according to solid line curved arrow 118 by means of handle 96 pin 44 and pin 46 are shifted in opposite directions (solid line arrows 120 and 122) into the positions as illustrated in FIGS. 2 and 3. In these positions the pin 44 is in a first position, where it intrudes in the bore 50 of trunnion cartridge 56. Pin 46 is in a second position where it is located outside its bore 54. In this case pin 44 in bore 50 provides a shaft for rotating the detector head 28 about first axis 40. The detector head is balanced with respect to a first (lighter) collimator.

When rotating the pinion 84 counterclockwise according to broken line curved arrow 124 by means of handle 96 pins 44 and 46 are shifted in opposite directions (broken line arrows 126 and 128) such that pin 46 now intrudes in its bore 54 (first position of pin 46), while pin 44 is located outside its bore 50 (second position of pin 44). In this case pin 46 in bore 54 provides a shaft for rotating the detector head 28 about second axis 42. The detector head is then balanced with respect to a second (heavier) collimator.

In shift positions between the first and second pin positions each pin 44 and 46 intrudes into its associated pin bore 50 and 54. So the pin cartridge 60 is always in safe connection with the trunnion cartridge 56.

Having thus described the invention with particular reference to the preferred forms thereof, it will be obvious to those skilled in the art to which the invention pertains, after understanding the invention, that various changes and modifications may be made therein without department from the spirit and scope of the invention as defined by the claims appended hereto.

What is claimed is:

1. A mechanism for pivotally mounting a detector head including a collimator onto supporting structure of a radiation detector, comprising:
   (a) means for mounting the head onto the supporting structure for rotation about a selected one of a first axis and a second axis; and
   (b) means for selecting the axis about which the detector head can rotate whereby the head will be rotatable about the axis which passes nearest to the center of gravity of the head;
   wherein the head mounting means includes
   (a1) a first pinhole and an associated first pin mounted between the supporting structure and the detector head concentric with the first axis and shiftable relatively to each other along the first axis between a first shift position wherein the first pin intrudes into the first pinhole and a second shift position wherein the first pin is located outside the first pinhole; and
   (a2) a second pinhole and an associated second pin mounted between the supporting structure and the detector head concentric with the second axis and shiftable relatively to each other along the second axis between a first shift position wherein the second pin intrudes into the second pinhole and a second shift position wherein the second pin is located outside the second pinhole;
   and wherein the axis selecting means includes
   means for shifting the pinholes and associated pins relatively to each other in opposite directions such that when one pinhole and the associated pin are in the first shift position, the other pinhole and associated pin are in the second shift position.

2. The mechanism according to claim 1, wherein each pinhole is stationary and the associated pins are shiftable relatively to each other and each pinhole.

3. The mechanism according to claim 2, wherein the pinholes are located at the detector head and the pins are located at the supporting structure.

4. The mechanism according to claim 3, wherein the detector head mounting means further comprises a trunnion ring for the detector head and wherein the pinholes are located at the trunnion ring.

5. The mechanism according to claim 1, wherein the head mounting means further comprising:
   (a3) a first cartridge having a first and a second bore as the first and second pinhole; and
   (a4) a second cartridge having an interior in which the first and second pins are located;
   wherein the first cartridge and the second cartridge are arranged with respect to each other such that both the first bore and the first pin are concentric with the first axis and both the second bore and the second pin are concentric with the second axis.

6. The mechanism according to claim 5, wherein the first cartridge is mounted at the detector head and the second cartridge is mounted at the supporting structure.

7. The mechanism according to claim 5, wherein the detector head mounting means further comprises a trunnion ring for the detector head and wherein the first cartridge is mounted at the trunnion ring.

8. The mechanism according to claim 5, wherein the head mounting means further comprising means for adjusting the distance between first and second cartridge.

9. The mechanism according to claim 8, wherein the distance adjusting means comprises:
   (a) an external screw at the first cartridge; and (b) a sleeve screwed at the external screw and pressing against the second cartridge;

wherein the distance is adjusted by screwing the sleeve along the external screw, thereby varying the distance between first and second cartridge.

10. The mechanism according to claim 9, wherein the sleeve comprises:
   (a) a lock nut screwed at the external screw;
   (b) a lock washer mounted at the lock nut; and
   (c) a ring mounted at the first cartridge and pressing against the second cartridge.

11. The mechanism according to claim 5, wherein each pin comprises an alignment pin and the second cartridge comprises an alignment slot for each alignment pin.

12. The mechanism according to claim 11, wherein the alignment pin is a dowel pin.

13. The mechanism according to claim 5, wherein the second cartridge comprises a cover for covering the open cartridge end opposite to the first cartridge.

14. The mechanism according to claim 1, wherein the shifting means comprises:
   (a) a rotatable driving pinion;
   (b) a first rack for the rotatable driving pinion mounted at the first pin; and
   (c) a second rack for the rotatable driving pinion mounted at the second pin;

wherein the rotatable driving pinion is mounted between the first and second racks of the first and second pins for shifting the first and the second pin relatively to each other in opposite directions when the pinion is rotated.

15. The mechanism according to claim 14, wherein said shifting means further comprising means for rotating said driving pinion between a first and a second pinion position, wherein in the first pinion position the first pinhole and the associated first pin are in the first shift position, while the second pinhole and the associated second pin are in the second shift position and wherein in the second pinion position the second pinhole and the associated second pin are in the first shift position, while the first pinhole and the associated first pin are in the second shift position.

16. The mechanism according to claim 15, wherein said pinion rotating means comprises a rotatable handle.

17. The mechanism according to claim 1, wherein in shift positions between the first shift position and the second shift position each pin intrudes into its associated pinhole.

* * * * *